United States Patent Office 3,219,543
Patented Nov. 23, 1965

3,219,543
PRODUCTION OF AMINO ACIDS
John D. Douros, Jr., Fanwood, N.J., and Richard L. Raymond, Wilmington, Del., assignors to Sun Oil Company, Philadelphia, Pa., a corporation of New Jersey
No Drawing. Filed Sept. 5, 1963, Ser. No. 306,670
5 Claims. (Cl. 195—1)

This invention relates to a process for the production of amino acids. More particularly, this invention relates to the fermentation of hydrocarbons to produce methionine and other valuable amino acids.

Heretofore, the microbiological production of amino acids such as lysine, methionine, isoleucine, valine, and the like has required the use of expensive and complex carbohydrate media and/or the use of equally expensive and hard-to-obtain precursors which had to be added to the fermentation broth. Moreover, the yields of amino acids obtained by these prior art methods have always been poor and the rate of accumulation of product very slow.

Therefore, it is an object of this invention to provide a process for the production of amino acids utilizing an inexpensive substrate which microorganisms will readily convert to amino acids in good yield.

It has now been found, in accordance with the present invention, that this and other objects of this invention may be achieved by growing strains of microorganisms hereinafter described below on inexpensive hydrocarbon substrates as essentially the sole carbon source to yield a mixture of amino acids, and particularly lysine and methionine, which are useful individually and collectively as feed supplements. That hydrocarbon substrates may be employed in this manner is particularly surprising since most work with hydrocarbons heretofore has resulted in the formation of carbon dioxide and water as the principal fermentation products rather than commercially valuable oxygenated organic products.

The microorganisms employed in accordance with this process are those capable of converting hydrocarbons to amino acids and include various new species of the genera Streptomyces and Mycobacterium which possess characteristics which are closely related to but cannot be identified as being the same as any species or strains described in Bergey's Manual of Determinative Bacteriology, 7th edition. It is, therefore, considered that these species of microorganism are new species. A culture of each of these new species has been deposited in the American Type Culture Collection in Washington, D.C., under the ATCC numbers designated below. These new species have the following bacteriological characteristics:

*Streptomyces coroniformis* ATCC 15074 possesses the following characteristics:

(1) Gram stain—gram positive, long rods to cocci
(2) Loeffler's blood serum—very good, white flaky growth
(3) Dorset egg medium—luxurious yellow-orange growth with white mycelium
(4) Kligler iron agar—yellowish brown growth with white mycelium
(5) Methyl red, Voges-Proskauer—both negative
(6) Sim's medium—Indole negative, no $H_2S$
(7) Glycerol agar—white flaky growth on surface, yellow growth along stab
(8) Litmus milk—no noticeable change
(9) Nitrate broth—nitrates reduced to nitrites
(10) Starch agar—white to grey transparent growth. Starch not hydrolyzed
(11) Potato dextrose agar—no growth
(12) Gelatin—fair growth, no liquefaction
(13) Carbohydrate test in phenol red broth using 0.5% specific carbohydrate substrate—

(a) Mannitol—no acid, no gas
    (b) Levulose—no acid, no gas
    (c) Lactose—no acid, no gas
    (d) Inositol—no acid, no gas
    (e) Saccharose—no acid, no gas
    (f) Arabinose—no acid, no gas
    (g) Maltose—no acid, no gas
    (h) Dextrose—no acid, no gas

*Mycobacterium tuberculosis* ATCC 15073 possesses the following cultural characteristics:

(1) Gram stain—gram positive, bipolar granules, thin rods
(2) Methylene blue stain—thin rods, granules
(3) Acid fast stain—acid fast, thin rods with granules
(4) Kligler iron agar—white to tan growth
(5) Methyl red, Voges-Proskauer—methyl red negative, V.P. negative
(6) Gelatin liquifaction—negative, no growth
(7) Nitrate broth—nitrite not produced (negative)
(8) Colony description—nutrient agar, cream colored, small colonies
(9) Litmus milk—no obvious change
(10) Loeffler's blood serum—moderate, smooth, raised growth, light tan
(11) Dorset egg medium—good growth, small colonies, light tan
(12) Sim's medium—no $H_2S$, Indole negative
(13) Glycerol agar—good growth, clear to cream colored, raised colonies
(14) Starch agar—doesn't hydrolyze starch, clear to cream colored, small dry colonies
(15) Potato dextrose agar—cream colored, raised growth
(16) Carbohydrate test in phenol red broth using 0.5% specific carbohydrate substrates—

(a) Mannitol—no acid, no gas
    (b) Levulose—no acid, no gas
    (c) Lactose—no acid, no gas
    (d) Inositol—no acid, no gas
    (e) Saccharose—no acid, no gas
    (f) Arabinose—no acid, no gas
    (g) Maltose—no acid, no gas
    (h) Dextrose—no acid, no gas Other species of hydrocarbon-utilizing, amino acid-producing organisms may be selected from soil samples or culture collections by conducting the fermentation under the conditions described herein. In general, it is desirable to select a specie producing at least one gram of product per liter of whole broth.

The nutrient medium employed for the culture of the aforesaid species of this invention to produce amino acids may vary considerably, but should contain, in addition to the hydrocarbon substrate as essentially the sole source of carbon, a source of nitrogen and of mineral salts. The type of hydrocarbon substrate employed may vary widely ranging from lower alkyl compounds such as methane or ethane to substituted aromatics such as dimethyl naphthalenes. Where the hydrocarbons are volatile, it is preferred to use a closed system to insure maximum utilization of the substrate by the microorganism and to prevent loss of the volatile substrate into the atmosphere. Other specific hydrocarbons which have been found to be useful in this process are such compounds of hexadecane, naphthalene, toluene, hexane, decane, dodecylbenzene, and the like. Mixtures of these and other hydrocarbons are likewise suitable. Thus, generally speaking, any refinery cuts which contain large amounts of normal paraffins in the $C_{10}$–$C_{30}$ range, such as Bahia gas oil or fuel oil No. 2 may be employed as substrates in this invention.

The quantity of hydrocarbon substrate employed in this process may range from 1 to 4 percent of the total nutrient medium. It is desirable in carrying out this process that the hydrocarbon substrate be introduced into the fermentation broth in small increments so that the hydrocarbon is present in the nutrient medium in amounts below growth-limiting concentrations. Thus, for example, where small amounts of hydrocarbon are being employed, it has been found preferable to introduce at the beginning of the fermentation, as little as 0.2 percent of the total hydrocarbon to be added, then, after twelve hours, an additional 0.1 percent, while after twenty-four hours, another 1 percent may be introduced into the fermentation broth. Depending upon the total amount of hydrocarbon to be utilized, proportionately larger amounts may be added at twelve to twenty-four hour periods thereafter until the fermentation is complete.

Examples of suitable nitrogen sources are urea, soybean meal, ammonium salts such as ammonium sulfate, ammonium phosphate, and the like. Other nitrogen sources may also be used, but they are generally somewhat less effective. Since this process is desirably carried out at a pH of from about 5.0 to 9.0, and preferably in a neutral medium, care must be exercised in maintaining this pH range when ammonia or ammonium salts are used as nitrogen sources in order that the pH not go too high. The concentration of suitable nitrogen source material in the nutrient medium is desirably from about 0.5 to 2 percent of the total nutrient medium.

The character of the mineral salts used in the nutrient medium will vary to some extent in accordance with the type of microorganism used and the type of hydrocarbon substrate. A suitable mineral salts composition, for example, is as follows.

| Compound: | μg./liter |
|---|---|
| $FeSO_4 \cdot 7H_2O$ | 1000 |
| $CuSO_4 \cdot 5H_2O$ | 197 |
| $H_3BO_3$ | 57 |
| $MnSO_4 \cdot H_2O$ | 31 |
| $ZnSO_4 \cdot H_2O$ | 193 |
| $Na_2MoO_4 \cdot 2H_2O$ | 35 |
| $CoCl_2 \cdot 6H_2O$ | 100 |
| $NiCl_2 \cdot 6H_2O$ | 5 |
| $CaCl_2$ | 1000 |

In addition to the foregoing constituents of the nutrient medium, a source of growth-stimulating materials may be used at a concentration of from about 0.01 to 0.1 percent of the total nutrient broth, although its presence is not essential. Material such as distiller's solubles, yeast extract, and other substances of this nature well known in the fermentation field are especially effective.

Culturing of the microorganisms in accordance with this process is carried out under aerobic conditions. While sufficient aeration is generally obtained in small flasks by mechanical agitation during the fermentation period, it is important in larger scale operations that the broth be stirred mechanically and sterile air introduced into the flasks by known methods. It has been generally found desirable to introduce from about one-half to one volume of air per minute for each volume of fermentation broth. For optimum yields of amino acids, fermentation of the microorganisms is conducted at about 20°–30° C., and preferably at 26° C. for a period of from about 48 to 120 hours.

The microorganism inoculum is desirably prepared by introducing a 2 milliliter wash from a culture slant into 100 milliliters of a complex carbohydrate nutrient medium contained in a 500 milliliter flask where it is grown for 16 to 24 hours. A 5 to 10 percent inoculum is then obtained from this culture broth by introducing 5 to 10 parts of this broth by volume into 100 parts of mineral salts-hydrocarbon fermentation medium described above.

In general, the present fermentation process results in the formation of amino acids in concentrations of about 1 to 3 grams of each acid per liter of whole fermentation broth. The amount of each acid in a particular fermentation both may readily be determined by microbiological assay methods known in the art. One such series of assay methods is described in the second edition of Microbiological Assay of the Vitamin B-Complex and Amino Acids (1952), by E. C. Barton Wright, Pitman Publishing Corp., New York.

The following examples are given for purposes of illustration and not by way of limitation:

Example I 500 ml. fermentation flask was prepared containing 100 ml. of a sterile nutrient medium having the following composition.

| Compound: | | |
|---|---|---|
| $MgSO_4$ | mg./liter | 400 |
| $(NH_4)_2SO_4$ | do | 3000 |
| $Na_2HPO_4$ | do | 3000 |
| $FeSO_4 \cdot 7H_2O$ | μg./liter | 1000 |
| $CuSO_4 \cdot 5H_2O$ | do | 197 |
| $H_3BO_2$ | do | 57 |
| $MnSO_4 \cdot H_2O$ | do | 31 |
| $ZnSO_4 \cdot H_2O$ | do | 193 |
| $Na_2MoO_4 \cdot 2H_2O$ | do | 35 |
| $CoCl_2 \cdot 6H_2O$ | do | 100 |
| $NiCl_2 \cdot 6H_2O$ | do | 5 |
| $CaCl_2$ | do | 1000 |

The pH of the above medium was adjusted to 7.0 with $NH_4OH$, and the medium was inoculated with a 3% vegetative inoculum of *Mycobacterium tuberculosis* ATCC 15073 which has been grown on decane for 48 hours, and the fermentation conducted on a rotary mechanical shaker at 300 r.p.m. at 26° C. for 96 hours. To each flask was added initially 4.4 mg. of decane substrate; 900 mg. of decane was added after 48 hours; an equal amount was added after 72 hours (total 1.5%), and the broth was harvested at 96 hours, at which time the bacterial cells and other impurities were removed by centrifugation and the amount of each amino acid present was determined by the aforementioned microbiological assay methods. The supernatant liquid was assayed as having a lysine content of 3.1 grams per liter and a methionine content of 0.6 gram per liter.

*Example II*

A fermentation was carried out in accordance with the procedure of Example 1 utilizing *Mycobacterium tuberculosis* ATCC 15073, but with a different hydrocarbon substrate as the carbon source in the nutrient medium. The following were added to the nutrient medium of Example 1 and the results determined by the microbiological assay method:

50% methane; 20% oxygen; 30% air
0.1% glucose (Cerelose)
0.01% yeast extract

The liquid assayed at 3.0 grams of lysine and 0.5 gram of methionine were obtained per liter after 108 hours.

When the above process was repeated without the glucose, an assay of 3.0 grams of lysine and 0.5 gram of methionine per liter of broth were obtained per liter after 168 hours.

*Example III*

The procedure of Example 2 was repeated with *Mycobacterium tuberculosis* ATCC 15073, but substituting 2% n-hexadecane substrate and 0.1% glucose. An assay of 2.2 grams of lysine and 0.3 gram of methionine was obtained after 108 hours.

When the above process was repeated without the glucose, 2.2 grams of lysine and 0.3 gram of methionine per liter of broth were obtained after 168 hours.

Example IV

The procedure of Example 2 was repeated using *Streptomyces coroniformis* ATCC 15074, but substituting 2% tetrahydronaphthalene, 0.1% glucose, and 0.01% yeast extract. An assay of 1.2 grams of lysine and 0.8 gram of methionine per liter was obtained after 108 hours.

When the above process was repeated without the glucose, 1.2 grams of lysine and 0.8 gram of methionine per liter of broth were obtained after 168 hours.

Example V

The procedure of Example 2 was repeated using *Streptomyces coroniformis* ATCC 15074, but substituting 2% toluene and 0.1% glucose. An assay of 0.9 gram of lysine and 0.7 gram of methionine per liter was obtained after 108 hours.

When the above procedure was repeated without the glucose, 0.9 gram of lysine and 0.7 gram of methionine per liter of broth were obtained after 168 hours.

Example VI

The processes of Examples 1 to 5 were repeated with the respective organisms using 0.1% glucose as the sole carbon source, i.e., in the absence of any hydrocarbon substrate. In each case the assays indicated that less than 0.2 gram of any of the amino acids was present per liter of broth.

The invention claimed is:

1. A process for the production of lysine and methionine from hydrocarbons which comprises cultivating a microorganism selected from the species consisting of *Mycobacterium tuberculosis* ATCC 15073 and *Streptomyces coroniformis* ATCC 15074 in an aqueous nutrient medium containing a source of nitrogen and carbon, said carbon being derived essentially from hydrocarbons, under aerobic conditions at a pH of from about 5.0 to 9.0 and at a temperature of from about 20° C. to 30° C.

2. A method for the production of amino acids from hydrocarbons which comprises cultivating *Mycobacterium tuberculosis* ATCC 15073 under aerobic conditions in an aqueous nutrient medium comprising a source of nitrogen and a hydrocarbon as the essential source of carbon.

3. Method according to claim 2 wherein said conditions includes a pH in the range of 5.0–9.0 and a temperature in the range of 20–30° C.

4. A method for the production of amino acids from hydrocarbons which comprises cultivating *Streptomyces coroniformis* ATCC 15074 under aerobic conditions in an aqueous nutrient medium comprising a source of nitrogen and a hydrocarbon as the essential source of carbon.

5. Method according to claim 4 wherein said conditions include a pH in the range of 5.0–9.0 and a temperature in the range of 20–30° C.

References Cited by the Examiner

UNITED STATES PATENTS

| | | | |
|---|---|---|---|
| 2,697,061 | 12/1954 | Harris et al. | 195—3 X |
| 2,830,934 | 4/1958 | Freaney | 195—117 X |
| 2,906,673 | 9/1959 | Borrow et al. | 195—117 X |
| 2,912,363 | 10/1959 | La Roe | 195—117 X |
| 3,057,784 | 10/1962 | Davis et al. | 195—28 |

FOREIGN PATENTS 6,499    5/1961    Japan.

OTHER REFERENCES

Kinoshita: Advances in Applied Microbiology, 1959, pages 201–213, Academic Press Inc.

Stewart et al.: Journal of Bacteriology 78, 726–730, 1959.

Yamada et al.: Agricultural and Biological Chemistry (Japan), vol. 26, No. 9, p. 636, September 1962.

A. LOUIS MONACELL, *Primary Examiner.*